(12) United States Patent
Bernhardt et al.

(10) Patent No.: US 8,761,996 B2
(45) Date of Patent: Jun. 24, 2014

(54) METHOD AND DEVICE FOR LEARNING THE NEUTRAL POSITION OF THE ACCELERATOR PEDAL OF A MOTOR VEHICLE

(75) Inventors: Roger Bernhardt, Donaustauf (DE); Wolfgang Meier, Amberg (DE)

(73) Assignee: Continental Automotive GmbH, Hannover (DE)

( * ) Notice: Subject to any disclaimer, the term of this patent is extended or adjusted under 35 U.S.C. 154(b) by 609 days.

(21) Appl. No.: 12/989,458

(22) PCT Filed: Apr. 16, 2009

(86) PCT No.: PCT/EP2009/054501
§ 371 (c)(1),
(2), (4) Date: Oct. 25, 2010

(87) PCT Pub. No.: WO2009/132962
PCT Pub. Date: Nov. 5, 2009

(65) Prior Publication Data
US 2011/0040457 A1    Feb. 17, 2011

(30) Foreign Application Priority Data

Apr. 29, 2008   (DE) .......................... 10 2008 021 385

(51) Int. Cl.
| | |
|---|---|
| *G01M 17/00* | (2006.01) |
| *G06F 7/00* | (2006.01) |
| *G06F 19/00* | (2011.01) |
| *B60R 22/00* | (2006.01) |
| *E05F 15/00* | (2006.01) |
| *G05D 1/00* | (2006.01) |
| *G05D 3/00* | (2006.01) |

(52) U.S. Cl.
USPC ........................... 701/33.1; 701/49; 701/30.3

(58) Field of Classification Search
USPC ................ 701/1, 20.7, 29.1, 29.7–29.8, 30.3, 701/31.3, 33.1, 33.7–34.1, 34.4, 36, 49, 701/58–59; 702/57–59, 64–68, 70, 85, 94, 702/104–105; 123/339.14–339.15
See application file for complete search history.

(56) References Cited

U.S. PATENT DOCUMENTS

| 4,516,671 | A | * | 5/1985 | Nishikawa et al. ........... 477/169 |
| 4,843,555 | A | * | 6/1989 | Hattori et al. ................. 701/110 |

(Continued)

FOREIGN PATENT DOCUMENTS

| DE | 3612904 A1 | 10/1987 | ............. G05B 13/02 |
| DE | 19939809 | 2/2001 | ............. B60K 26/02 |

(Continued)

OTHER PUBLICATIONS

Chinese Office Action, Application No. 200980115383.4, 18 pages, Jan. 14, 2013.

*Primary Examiner* — Khoi Tran
*Assistant Examiner* — Abby Lin
(74) *Attorney, Agent, or Firm* — King & Spalding L.L.P.

(57) ABSTRACT

In a method and a device for learning the neutral position of the accelerator pedal of a motor vehicle, the lowest pedal voltage is determined during a first drive cycle, the voltage remaining constant over a specific period of time and repeating itself several times within the drive cycle. A minimum pedal value is confirmed and set on the basis of the determined lowest pedal value that has been confirmed in at least one succeeding drive cycle. Finally, a plausibility check on the confirmed lowest pedal value is performed. The method and the device are characterized by particular robustness.

10 Claims, 2 Drawing Sheets

(56) References Cited

U.S. PATENT DOCUMENTS

| | | | |
|---|---|---|---|
| 5,225,982 A * | 7/1993 | Ito et al. | 701/91 |
| 5,253,172 A * | 10/1993 | Ito et al. | 701/41 |
| 5,309,362 A * | 5/1994 | Ito et al. | 701/90 |
| 5,710,565 A * | 1/1998 | Shirai et al. | 342/70 |
| 6,295,501 B1 | 9/2001 | Funcke et al. | 701/110 |
| 6,574,546 B2 | 6/2003 | Nada | 701/110 |
| 6,588,256 B2 | 7/2003 | Gassner et al. | 73/116 |
| 6,805,022 B1 | 10/2004 | Steindl et al. | 74/513 |
| 7,110,870 B2 * | 9/2006 | Tseng et al. | 701/29.2 |
| 2003/0106527 A1 | 6/2003 | Farmer et al. | 123/396 |
| 2007/0278021 A1 | 12/2007 | Pott et al. | 180/65.2 |
| 2011/0040457 A1 | 2/2011 | Bernhardt et al. | 701/49 |

FOREIGN PATENT DOCUMENTS

| | | | |
|---|---|---|---|
| DE | 10038181 A1 | 3/2002 | B60K 41/00 |
| DE | 60104767 T2 | 9/2005 | B60K 41/00 |
| DE | 102006019031 A1 | 10/2007 | B60W 20/00 |
| EP | 1153786 | 11/2001 | B60K 26/02 |
| JP | 4262927 | 9/1992 | B60K 26/02 |
| JP | 07004299 | 1/1995 | F02D 45/00 |
| WO | 2009/132962 A1 | 11/2009 | B60K 26/02 |

* cited by examiner

METHOD AND DEVICE FOR LEARNING THE NEUTRAL POSITION OF THE ACCELERATOR PEDAL OF A MOTOR VEHICLE

CROSS-REFERENCE TO RELATED APPLICATIONS

This application is a U.S. National Stage Application of International Application No. PCT/EP2009/054501 filed Apr. 16, 2009, which designates the United States of America, and claims priority to German Application No. 10 2008 021 385.3 filed Apr. 29, 2008, the contents of which are hereby incorporated by reference in their entirety.

TECHNICAL FIELD

The present invention relates to a method for learning the neutral position of the accelerator pedal of a motor vehicle.

BACKGROUND

The movement of a motor vehicle is defined through actuation of the accelerator pedal, wherein an accelerator pedal sensor, for example, measures the degree to which the accelerator pedal has been pressed and the degree of injection of an injection system, for example, is controlled as a function of the output signal emitted by the accelerator pedal sensor. When the accelerator pedal is not actuated the accelerator pedal sensor normally outputs a zero signal corresponding, for example, to the idle running mode of operation of the motor vehicle. However, if the accelerator pedal sensor outputs a signal or, as the case may be, an accelerator pedal voltage which is greater than zero, even though the accelerator pedal has not been pressed, this leads to the deactivation of monitoring mechanisms, resulting in the inability to detect and avoid unexpected accelerations. This can lead to problems. Deviations of this kind may be attributable to manufacturing tolerances, but can also be due to operating deviations of electrical or mechanical origin. Such deviations of an electrical kind include, for example, intermittent shunt resistances or short-circuits. Deviations of a mechanical type can be based, for example, on the fact that the accelerator pedal no longer returns completely to the neutral position (initial position) due, for example, to material fatigue (in springs, etc.).

In order to rectify the problems described in the foregoing, a learning technique was developed for the purpose of changing the output value (pedal voltage) of the accelerator pedal sensor corresponding to the low-pressure degree of the accelerator pedal from zero (neutral position of the accelerator pedal) to a more suitable value that corresponds to the actual neutral position. In this case the lowest pedal voltage measured in each drive cycle for each pedal track was used for defining the neutral position (idle position) of the accelerator pedal for the remainder of the drive cycle. No transfer took place in this case between different drive cycles. A certain robustness was achieved by ignoring the start phase, i.e. the learning process was not activated until a specific time had elapsed since the starting of the motor vehicle.

However, experience has shown that said learning technique or, as the case may be, adjustment strategy is not sufficiently robust to withstand in particular distortions caused by the aforementioned intermittent shunt resistances or short-circuits and mechanical variations in operation or manipulations.

SUMMARY

According to various embodiments, a method for learning the neutral position of the accelerator pedal of a motor vehicle can be provided, said method being characterized by a particularly high level of robustness.

According to an embodiment, a method for learning the neutral position of the accelerator pedal of a motor vehicle, may comprise the following steps: a. determining the lowest pedal voltage during a first drive cycle, which voltage remains constant over a specific period of time and repeats itself several times within the drive cycle; b. confirming and setting a minimum pedal value on the basis of the determined lowest pedal voltage that has been confirmed in at least one succeeding drive cycle; and c. performing a plausibility check on the confirmed minimum pedal value with the aid of at least one further pedal sensor.

According to a further embodiment, the plausibility check can be used in order to differentiate between an electrical and a mechanical drift. According to a further embodiment, the lowest pedal voltage can be confirmed in a plurality of succeeding different drive cycles.

According to another embodiment, a device for performing a method as described above may comprise a means for determining the lowest pedal voltage during a first drive cycle, which voltage remains constant over a specific period of time and repeats itself several times within the drive cycle; a means for confirming and setting a minimum pedal value on the basis of the determined lowest pedal voltage that has been confirmed in at least one succeeding drive cycle; and a means for performing a plausibility check on the confirmed minimum pedal value with the aid of at least one further pedal sensor. According to a further embodiment of the device, the means for performing a plausibility check can be used in order to differentiate between an electrical and a mechanical drift. According to a further embodiment of the device, in the case of the means for confirming and setting a minimum pedal value the lowest pedal voltage can be confirmed in a plurality of succeeding different drive cycles.

BRIEF DESCRIPTION OF THE DRAWINGS

The invention is explained in detail below with reference to an exemplary embodiment in conjunction with the drawing, in which.

DETAILED DESCRIPTION

As mentioned above, a method for learning the neutral position of the accelerator pedal of a motor vehicle comprises the following steps:

a. determining the lowest pedal voltage during a first drive cycle, which voltage remains constant over a specific period of time and repeats itself several times within the drive cycle;

b. confirming and setting a minimum pedal value on the basis of the determined lowest pedal voltage that has been confirmed in at least one succeeding drive cycle; and c. performing a plausibility check on the confirmed minimum pedal value with the aid of at least one further pedal sensor.

In contrast to the aforementioned prior art, the determination of the minimum pedal value corresponding to the neutral position of the accelerator pedal is based, not on the lowest measured voltage, but on the lowest voltage that remains constant over a specific period of time and repeats itself several times during the drive cycle. Said lowest pedal voltage that remains constant over a specific period of time is confirmed in at least one succeeding drive cycle, and a minimum pedal value is set on the basis of said voltage and finally confirmed.

Finally, a plausibility check on the confirmed minimum pedal value is performed with the aid of at least one further pedal sensor.

The plausibility check is preferably used in order to differentiate between an electrical and a mechanical drift.

In an embodiment, the lowest pedal voltage is confirmed in a plurality of succeeding different drive cycles.

With the aid of the performed plausibility check it is therefore possible to successfully identify deviations induced by electrical or mechanical phenomena, the latter being caused for example by spring fatigue, that can permanently affect the operating characteristics of the vehicle.

According to another embodiment, a device for learning the neutral position of the accelerator pedal may comprises the following components:
a means for determining the lowest pedal voltage during a first drive cycle, which voltage remains constant over a specific period of time and repeats itself several times within the drive cycle;
a means for confirming and setting a minimum pedal value on the basis of the determined lowest pedal voltage that has been confirmed in at least one succeeding drive cycle; and
a means for performing a plausibility check of the confirmed minimum pedal value with the aid of at least one further pedal sensor.

The means for performing the plausibility check is preferably used in order to differentiate between an electrical and a mechanical drift. The means for confirming and setting a minimum pedal value confirms the lowest pedal voltage preferably in a plurality of succeeding different drive cycles.

Figure 1:
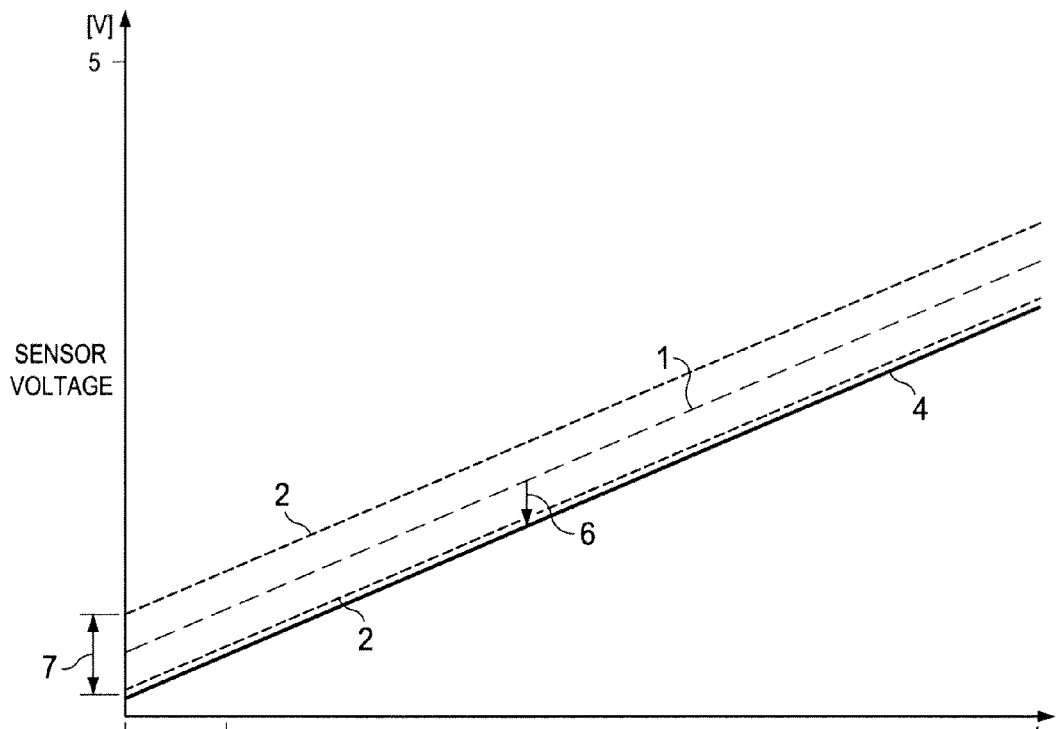
FIG. 1 is a diagram showing the pedal voltage curve as well as corresponding possibilities for deviating from the nominal state.

In the diagram shown in FIG. 1, the mechanical movement of the accelerator pedal is expressed as a percentage on the abscissa, whereas the corresponding pedal voltage (sensor voltage) is given in volts on the ordinate. The dashed line 1 shows the curve of the pedal voltage as a function of the pedal movement. The dashed lines 2 indicate the maximum and minimum curve of the pedal voltage at maximum production tolerance. The continuous line 4 shows the possible curve of the pedal voltage at end of life. A corresponding mechanical drift 5, caused, for example, by fatigue in a return spring, a corresponding electrical drift 6, caused, for example, by an increase in resistance, and a corresponding production tolerance range 7 are shown as the deviation of the pedal voltage from the nominal voltage.

Figure 2:
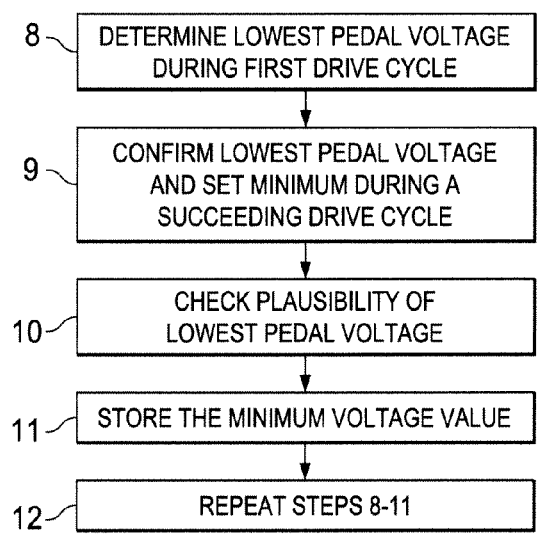
FIG. 2 is a block diagram in which the main steps of the method are listed.

The main steps in the method according to various embodiments are summarized in the diagram shown in FIG. 2. At a first step 8, the lowest pedal voltage during a first drive cycle is determined, wherein said lowest pedal voltage must remain constant over a specific period of time and repeat itself several times within the drive cycle. At a second step 9, the minimum pedal value is confirmed and set during at least one succeeding drive cycle, preferably in this case in a plurality of succeeding different drive cycles. At the third step 10, which can also take place before the second step, a plausibility check on the confirmed minimum pedal value is performed with the aid of a further pedal sensor. At step 11, the obtained value is stored. According to step 12, the above-described method can be repeated after the motor vehicle has been driven or has been traveling for a relatively long time.

Figure 3:
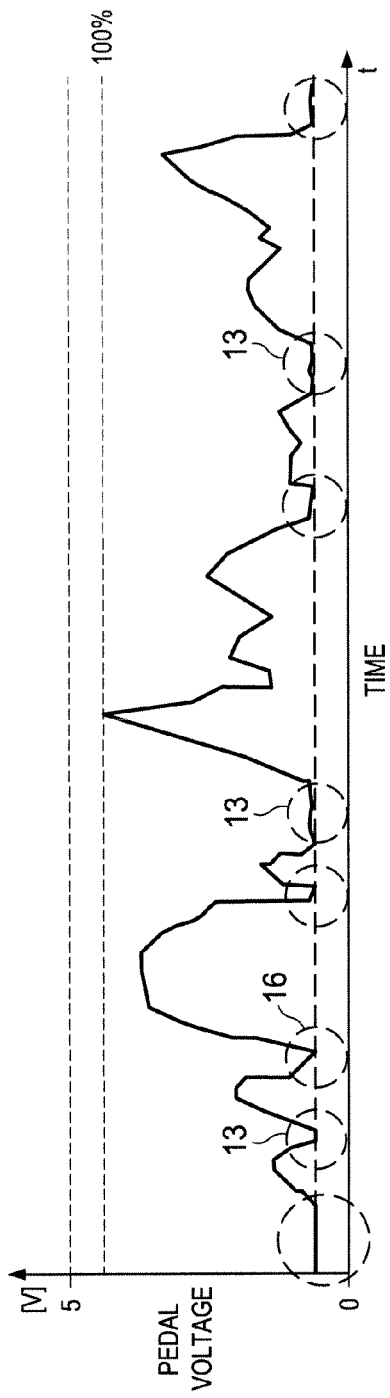
FIG. 3 is a diagram illustrating how the lowest pedal voltage is determined.

In the diagram shown in FIG. 3, the time is plotted on the abscissa and the pedal voltage in V on the ordinate. The pedal voltage curve during a first drive cycle is shown. Reference numeral 13 designates the lowest pedal voltage during the first drive cycle, which voltage, according to the specification, must remain constant over a specific period of time. In this graph, reference numeral 16 illustrates the case where the lowest pedal voltage does not fulfill the corresponding condition due to insufficient duration.

Figure 4:
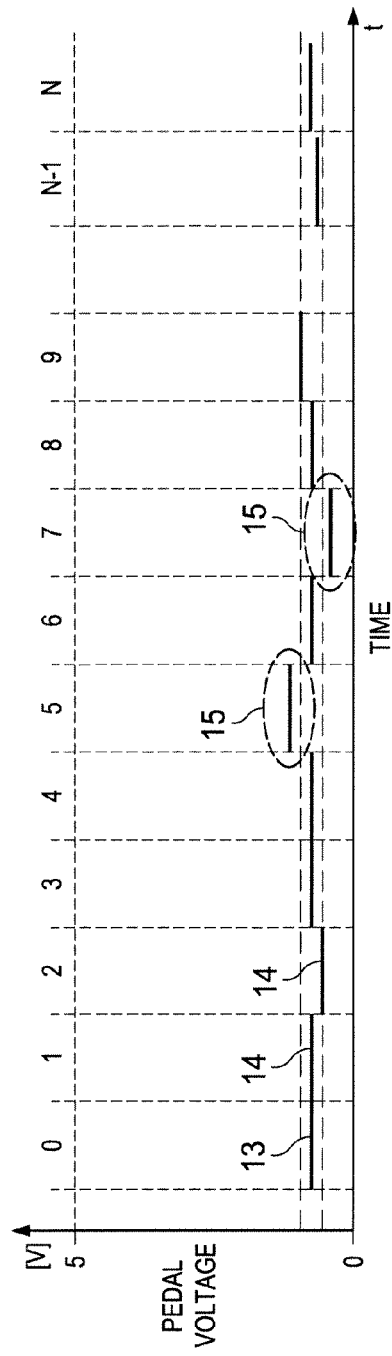
FIG. 4 is a diagram illustrating how the lowest pedal voltage is determined in different drive cycles.

FIG. 4 shows the pedal voltage in the different drive cycles. The first drive cycle is designated by "0", while a plurality of succeeding different drive cycles are represented by N−1. The pedal voltage indicated at 14 fulfills the corresponding conditions. The pedal voltage indicated at 15 does not fulfill these conditions due, for example, to temperature effects or mechanical obstructions and consequently drops out of the range indicated by dashed lines. If the number of confirmed drive cycles (in this case all cycles except cycles 5 and 7) is greater than the number of required cycles (reference value), the following plausibility check on the confirmed minimum pedal value is performed with the aid of a further pedal sensor. If this is not the case, the corresponding limit values can be adjusted slightly, for example, and a new check can be carried out to establish whether the minimum pedal value can be determined and confirmed sufficiently frequently.

What is claimed is:

1. An automated method setting a neutral position of accelerator pedal of a motor vehicle corresponding to an idle running mode of the motor vehicle, the method comprising the following steps:
    sensing a pedal voltage corresponding to a position of the accelerator pedal with a first sensor;
    communicating the sensed pedal voltage to a computer processor;
    determining with the computer processor a lowest pedal voltage occurring during a first drive cycle, wherein the first drive cycle includes multiple discrete periods of the sensed pedal voltage remaining at the lowest pedal voltage for at least a predetermined period of time, the multiple discrete periods occurring during the first drive cycle being separated by periods in which the sensed pedal voltage increases above the lowest pedal voltage;
    confirming the determined lowest pedal voltage during at least one succeeding drive cycle;
    setting a minimum pedal value based on the confirmed lowest pedal voltage;
    performing a plausibility check with the computer processor on the minimum pedal value using at least one further pedal sensor; and
    defining the neutral position of the accelerator pedal based on the minimum pedal value and storing the neutral position in a non-transitory computer readable memory in communication with the computer processor.

2. The method according to claim 1, wherein the plausibility check is used in order to differentiate between an electrical and a mechanical drift.

3. The method according to claim 1, wherein the lowest pedal voltage is confirmed in a plurality of succeeding different drive cycles.

4. A device for learning a neutral position of an accelerator pedal of a motor vehicle, the device comprising:
    a means for determining a lowest pedal voltage occurring during a first drive cycle, wherein the first drive cycle includes multiple discrete periods of the sensed pedal voltage remaining at the lowest pedal voltage for at least a predetermined period of time, the multiple discrete periods occurring during the first drive cycle being separated by periods in which the sensed pedal voltage increases above the lowest pedal voltage;

a means for confirming the determined lowest pedal voltage during at least one succeeding drive cycle;

a means for setting a minimum pedal value based on the confirmed lowest pedal; and a means for performing a plausibility check on the minimum pedal value.

5. The device according to claim 4, wherein the means for performing a plausibility check is used in order to differentiate between an electrical and a mechanical drift.

6. The device according to claim 4, wherein the means for confirming the lowest pedal voltage operates in a plurality of succeeding different drive cycles.

7. A system for learning a neutral position of an accelerator pedal of a motor vehicle, comprising
an accelerator pedal,
first and second sensors coupled with said accelerator pedal generating a pedal voltage representative of a pedal position, and
an device operable to:
determine a lowest pedal voltage during a first drive cycle from the first sensor, wherein said first drive cycle includes multiple discrete periods of the sensed pedal voltage remaining at the lowest pedal voltage for at least a predetermined period of time, the multiple discrete periods occurring during the first drive cycle being separated by periods in which the sensed pedal voltage increases above the lowest pedal voltage,
confirm the determined lowest pedal voltage during at least one succeeding drive cycle,
set a minimum pedal value based on the confirmed lowest pedal voltage, and
perform a plausibility check on the minimum pedal value with the second sensor.

8. The system according to claim 7, further comprising a memory to store the confirmed minimum pedal value.

9. The system according to claim 7, wherein the device is further operable to repeat the determination of the minimum pedal value after the motor vehicle has been driven or has been traveling for a predetermined period of time.

10. The system according to claim 7, wherein the plausibility check is performed at any time after the minimum pedal value is set.

* * * * *